US008384513B2

(12) United States Patent
Witkowski

(10) Patent No.: US 8,384,513 B2
(45) Date of Patent: Feb. 26, 2013

(54) TRANSMITTER AND METHOD FOR TRANSMITTING AN RF CONTROL SIGNAL

(75) Inventor: Todd R. Witkowski, Zeeland, MI (US)

(73) Assignee: Johnson Controls Technology Company, Holland, MI (US)

( * ) Notice: Subject to any disclaimer, the term of this patent is extended or adjusted under 35 U.S.C. 154(b) by 1072 days.

(21) Appl. No.: 11/324,745

(22) Filed: Jan. 3, 2006

(65) Prior Publication Data

US 2007/0152798 A1 Jul. 5, 2007

(51) Int. Cl.
*H04L 9/32* (2006.01)

(52) U.S. Cl. ........................................ 340/5.26; 340/5.7

(58) Field of Classification Search ................... 340/5.2, 340/5.21, 5.26, 5.71, 5.73, 5.1, 5.22, 5.23, 340/5.24, 5.25, 5.72
See application file for complete search history.

(56) References Cited

U.S. PATENT DOCUMENTS 5,898,230 A * 4/1999 Bartel et al. ................. 340/5.26
6,078,271 A * 6/2000 Roddy et al. ............. 340/825.72
6,181,255 B1 1/2001 Crimmins et al.
6,486,795 B1 11/2002 Sobel et al.
6,965,757 B2 11/2005 Eray
2002/0163440 A1 11/2002 Tsui
2002/0197955 A1 12/2002 Witkowski et al.
2003/0228879 A1 12/2003 Witkowski et al.
2004/0008798 A1 1/2004 Tsui
2004/0048622 A1 3/2004 Witkowski et al.
2004/0110472 A1 6/2004 Witkowski et al.
2004/0203379 A1 10/2004 Witkowski et al.
2004/0207537 A1 10/2004 Keller, Jr. et al.
2005/0024184 A1 2/2005 Chuey
2005/0024185 A1 2/2005 Chuey
2005/0024229 A1 2/2005 Chuey
2005/0024230 A1 2/2005 Chuey
2005/0024254 A1 2/2005 Chuey
2005/0024255 A1 2/2005 Chuey
2005/0026601 A1 2/2005 Chuey
2005/0026602 A1 2/2005 Chuey et al.
2005/0026605 A1 2/2005 Guthrie et al.
2005/0090279 A9 4/2005 Witkowski et al.
2005/0141594 A1 6/2005 Smith et al.
2005/0242970 A1 11/2005 Blaker et al.

(Continued)

FOREIGN PATENT DOCUMENTS

GB 2315892 A 2/1998
WO WO 2004/077729 A2 9/2004

OTHER PUBLICATIONS

International Search Report and Written Opinion for application PCT/US2006/049646, date of mailing May 31, 2007, received date Jun. 4, 2007, 8 pgs.

(Continued)

*Primary Examiner* — Jennifer Mehmood
*Assistant Examiner* — Yong Hang Jiang
(74) *Attorney, Agent, or Firm* — Foley & Lardner LLP

(57) ABSTRACT

A transmitter for transmitting an RF control signal to a remote system includes a user input device, a memory and a transmitter circuit. The memory includes control data associated with the remote device. The control data includes a first frequency and a second frequency. The transmitter circuit is coupled to the user input device and memory. In response to a single user input, the transmitter circuit generates a rolling code signal, transmits the rolling code signal at the first frequency for a predetermined amount of time, and, upon expiration of the predetermined about of time, transmits the rolling code signal at the second frequency.

14 Claims, 4 Drawing Sheets

U.S. PATENT DOCUMENTS

| | | | |
|---|---|---|---|
| 2006/0158344 | A1 | 7/2006 | Bambini et al. |
| 2006/0214813 | A1 | 9/2006 | Witkowski et al. |
| 2006/0232377 | A1 | 10/2006 | Witkowski |
| 2007/0008065 | A1 | 1/2007 | Shearer et al. |
| 2007/0028471 | A1 | 2/2007 | Olson et al. |
| 2007/0057810 | A1 | 3/2007 | Bos et al. |
| 2007/0152798 | A1 | 7/2007 | Witkowski |

OTHER PUBLICATIONS

Chinese Second Office Action as received in China Patent Application No. 201010213112.7 and its English Translation, 5 pages.

* cited by examiner

TRANSMITTER AND METHOD FOR TRANSMITTING AN RF CONTROL SIGNAL

FIELD

The present invention relates generally to the field of RF transmitters and more particularly to a transmitter and method for transmitting an RF control signal at multiple frequencies.

BACKGROUND

Wireless control systems are used in many different applications to provide a method of remote control of devices or systems. Wireless control systems, such as garage door opener systems, home security systems, gate controllers, etc., typically employ a portable, hand-held transmitter (i.e., an original transmitter) to transmit a control signal to a receiver located at a remote system or device. For example, a garage door opener system typically includes a receiver located within a home owner's garage and coupled to the garage door opener. A user presses a button on the original transmitter to transmit a radio frequency signal to the receiver to activate the garage door opener to open and close a garage door. Accordingly, the receiver is tuned to the frequency of its associated original transmitter and demodulates a predetermined code programmed into the original transmitter and the receiver for operating the garage door.

To enhance security of wireless control systems, such as a garage door opener system, manufacturers commonly use encryption technology to encrypt the radio frequency signal sent from a transmitter to a receiver. One such encryption method is a rolling code system, where each digital message sent from the transmitter to the receiver has a different code from the previous digital message. In one such system, a transmitter identifier (sometimes called a serial number) and an encrypted counter value (sometimes called a hop code) are sent with each transmission. A counter value in the transmitter increments each time the transmitter button is pressed. An encryption algorithm encrypts the counter value to create a new encrypted code or value. When the encrypted counter value is transmitted, it appears to bear no predictable relationship to the previously sent encrypted counter value, and thereby appears to "hop" from one value to another. The receiver also stores the counter value in unencrypted form. Upon receipt of an encrypted counter value for a particular transmitter identifier, the counter value is unencrypted and compared to the previously stored counter value to determine whether the garage door opener should be activated. If the new value is less than or the same as the previously stored counter value, it may have come from a code grabber, and, therefore, the receiver does not activate the garage door opener. If the new value is greater than the previously stored counter value but less than a predefined number, the garage door is activated. If the new value is greater than the predefined number ahead of the previously stored counter value, the receiver stores the value, but does not activate the garage door opener. Upon receipt of the next counter value from the transmitter, if the receiver determines that the two values are in sequence, the garage door is activated and the most recently received counter value is stored in memory. The system described above is just one example of many types of rolling code based systems.

As an alternative to a portable, hand-held original transmitter, a trainable (or universal) transmitter or transceiver may be provided in, for example, a vehicle, for use with remote control devices or systems. An example of a trainable or universal transmitter is the HomeLink® trainable transmitter manufactured by Johnson Controls Interiors, LLC, Holland, Mich. A trainable transmitter may be configurable by a user to activate one or more of a plurality of different receivers using different radio frequency messages. In one example, a trainable transmitter may be trained to an existing original transmitter for a wireless control system by holding the two transmitters in close range and pressing buttons on the original transmitter and trainable transmitter simultaneously. The trainable transmitter identifies the type of wireless control system associated with the original transmitter based on the radio frequency signal received from the original transmitter. The trainable transmitter may then identify and store the control data and RF carrier frequency of the original transmitter radio frequency control signal. For systems employing a rolling code (or other encryption method), the trainable transmitter and wireless control system receiver are then synchronized so that, for example, the counters of the trainable transmitter and the receiver begin at the same value. Once trained, the trainable transmitter may be used to transmit RF signals to the receiver to control the wireless control system.

An original transmitter or trainable transmitter is configured to send a control signal at the frequency to which the receiver of a wireless control system is tuned. If, however, a wireless control system is dual- or multiple-frequency (i.e., capable of operating at one of multiple frequencies), it is possible that certain existing trainable transmitters or receivers may not be compatible with one or more of the operating frequencies of the wireless control system. Such a problem may also occur when a manufacturer of a wireless control system changes the frequency of operation for new versions of the wireless control system. Accordingly, there is a need for a transmitter that is capable of transmitting an RF control signal at two frequencies in response to a single user input. Further, there is a need for a transmitter that is configured to, in response to a single user input, transmit a rolling code message at a first frequency and to transmit the same rolling code message at a second frequency.

SUMMARY

In accordance with an embodiment, a transmitter for transmitting an RF control signal to a remote system includes a user input device, a memory having control data associated with the remote device including a first frequency and a second frequency, and a transmitter circuit coupled to the user input device and memory, the transmitter circuit configured to, in response to a single user input, generate a rolling code signal, to transmit the rolling code signal at the first frequency for a predetermined amount of time, and, upon expiration of the predetermined amount of time, to transmit the rolling code signal at the second frequency.

In accordance with another embodiment, a method for transmitting an RF control signal to a remote system includes receiving a single user input to request transmission of an RF control signal, generating a rolling code signal based on control data associated with the remote system in response to the single user input, the control data including a first frequency and a second frequency, transmitting the rolling code signal at the first frequency for a predetermined amount of time, and upon expiration of the predetermined amount of time, transmitting the rolling code signal at the second frequency.

BRIEF DESCRIPTION OF THE DRAWINGS

The invention will be more readily understood by reference to the following description taken with the accompanying drawings, in which.

DETAILED DESCRIPTION OF THE PREFERRED EMBODIMENTS

Figure 1:
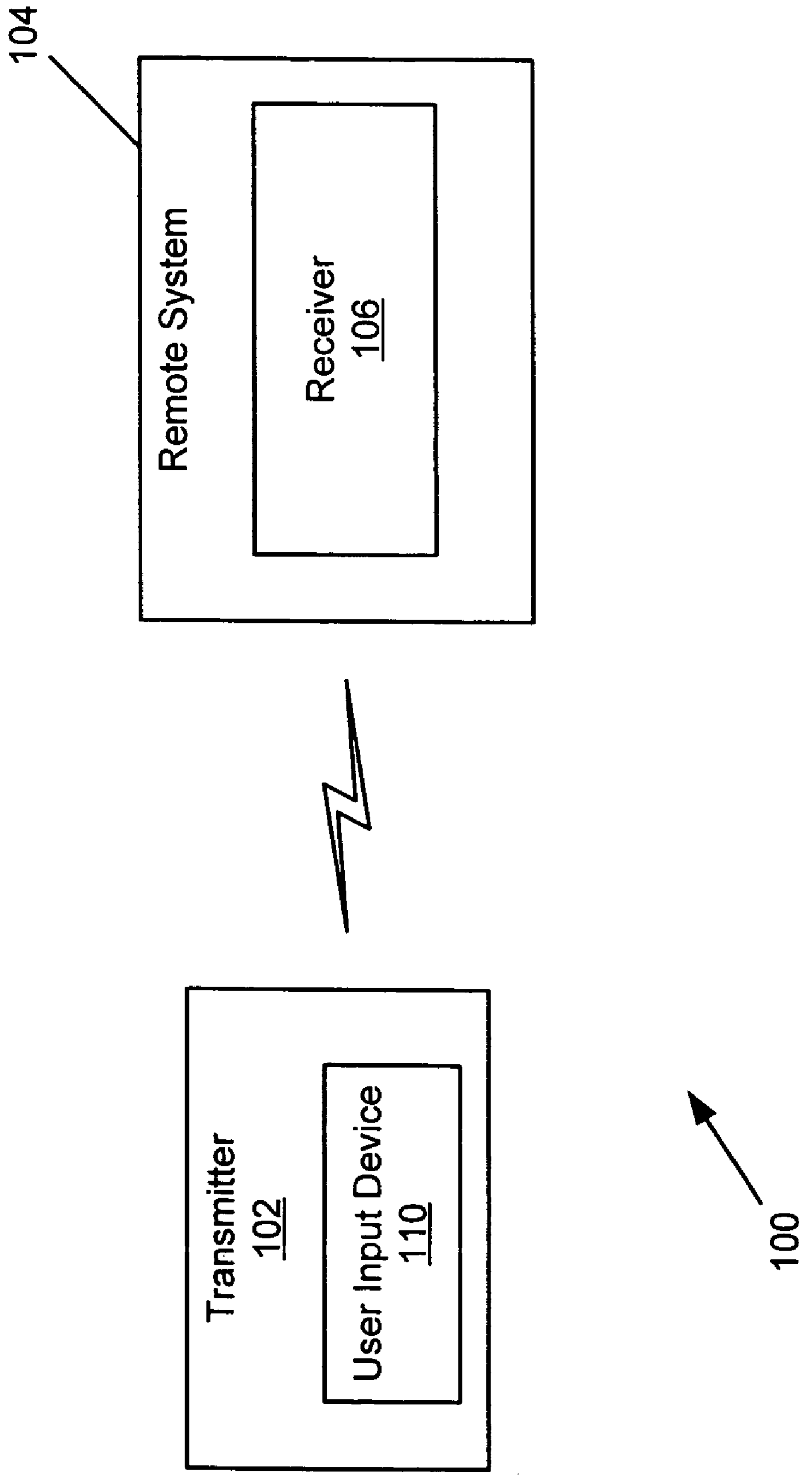
FIG. 1 is a schematic block diagram of a wireless control system in accordance with an embodiment.

FIG. 1 is a schematic block diagram of a wireless control system in accordance with an embodiment. Wireless control system 100 includes a transmitter 102 and a remote system 104. Transmitter 102 is a radio frequency transmitter configured to send wireless radio frequency messages to a receiver 106 of the remote system 104 to activate remote system 104. Transmitter 102 may be, for example, an original transmitter for wireless control system 100, a trainable transmitter or a trainable transceiver. An original transmitter is a transmitter, typically a hand-held transmitter, which is sold with remote system 104 or as an after market item, and which is configured to transmit an activation signal at a predetermined carrier frequency and having control data configured to activate remote system 104. A trainable transmitter or transceiver may be configurable by a user to activate one or more of a plurality of different receivers and associated remote systems using different radio frequency messages. A trainable transmitter or transceiver may be, for example, mounted in a vehicle and coupled to a vehicle interior element such as a visor, an overhead compartment, an instrument panel, a seat, a center console, a door panel or any other vehicle interior element. Alternatively, a trainable transmitter may be embodied in a hand-held device such as a portable housing, a key fob, a key chain, etc.

Remote system 104 may be, for example, a garage door opener, a gate opener or operator, a home alarm system, a home lighting system, a heating ventilation air conditioning (HVAC) system, a deadbolt door lock or entry door lock system, a home appliance, a remote keyless entry (RKE) system for an automobile, or other security or access-control system for residential and/or commercial applications. Remote system 104 includes or is coupled to a receiver 106 and an antenna (not shown) for receiving radio frequency messages including control data to control remote system 104. Each radio frequency control signal or message transmitted by transmitter 102 may be configured to activate remote system 104 via receiver 106 to cause remote system 104 to take some action, to synchronize, to arm or disarm a security system, to open a garage door or gate, to lock or unlock a deadbolt lock system, to lock or unlock a vehicle RKE system, to create a panic/alarm condition at a vehicle, or to cause some other function or effect.

Transmitter 102 includes a user input device 110 which may be, for example, a push button switch, a dial, knobs, a touch-screen display, a voice or speech-recognition system (e.g., a voice actuated input control circuit configured to receive voice signals from a user), or a biometric scanning device for improved security (e.g., a fingerprint scanner). Transmitter 102 and receiver 106 may include digital and/or analog circuitry to perform the functions described herein and may include, for example, one or more microprocessors, microcontrollers, application-specific integrated circuits, volatile and/or non-volatile memory and radio frequency transmit and/or receive components, such as transistors, inductors, antennas, etc. In one embodiment, transmitter 102 and receiver 106 communicate using encryption technology, for example, a rolling or variable code. Any of a variety of rolling code or non-rolling code encryption algorithms may be used, including those implemented in remote keyless entry systems and garage door opener systems.

Figure 2:
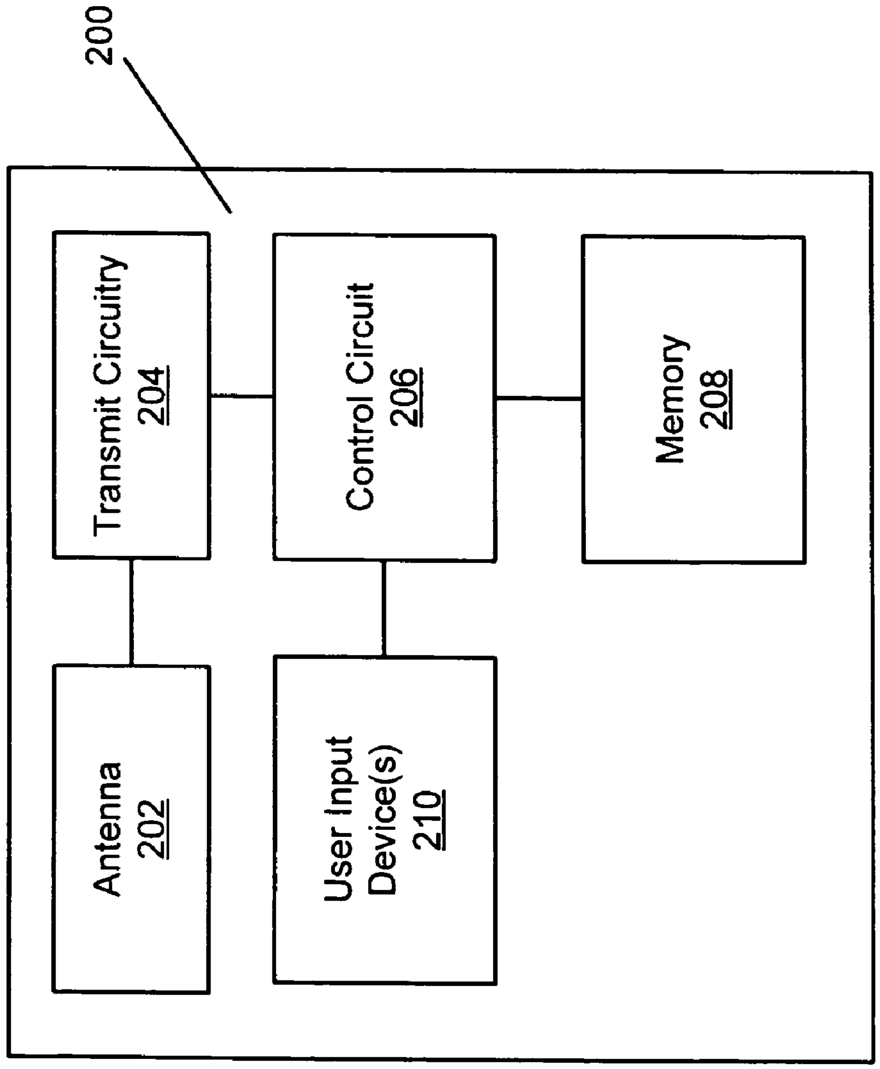
FIG. 2 is a block diagram of a transmitter in accordance with an exemplary embodiment.

In response to a single user input received via user input device 110 (e.g., a single button press), transmitter 102 is configured to generate and transmit an encrypted (e.g., rolling code) message. In particular, in response to the single user input, transmitter 102 is configured to generate and transmit an encrypted message at a first frequency for a predetermined period of time. Upon expiration of the predetermined period of time, transmitter 102 transmits the same encrypted message at a second frequency. The first and second frequencies may be associated with the remote system 104 and receiver 106. Receiver 106 may be configured to receive either of the first and second frequencies or only one of the first and second frequencies. FIG. 2 is a schematic block diagram of a transmitter in accordance with an embodiment. Transmitter 200 includes a transmitter circuit 204 that is coupled to an antenna 202. In an alternative embodiment, a single dual function transceiver having transmit and receive circuitry may be provided in place of transmitter circuit 204. As mentioned above, transmitter 200 may be, for example, an original transmitter or a trainable transmitter. Transmitter 200 may be trainable by way of receiving a signal from an original transmitter, by receiving user inputs for training, or by guessing a plurality of possible signals corresponding to receiver 106.

Transmitter circuit 204 is also coupled to a control circuit 206. Control circuit 206 may include various types of control circuitry, digital and/or analog, and may include a microprocessor, microcontroller, application specific integrated circuit (ASIC), or other digital and/or analog circuitry configured to perform various input/output, control, analysis, and other functions to be described herein. Control circuit 206 is coupled to user input device(s) 210 and a memory 208. User input device(s) 210 may be, for example, push buttons, switches, knobs, dials, voice actuated input, etc. Memory 208 includes volatile and/or non-volatile memory to, for example, store a computer program or other software to perform the functions described herein. Memory 208 is also configured to store information such as control data, carrier frequencies, and/or rolling code or other encryption algorithms associated with a remote system or systems. In one embodiment, the control data, frequency data and encryption algorithms are pre-stored in memory 208. In an alternative embodiment, the control data and frequency data may be learned and then stored in memory 208. At least one remote system for which information is stored in memory 208 may have more than one frequency of operation. For example, a remote system may have a first frequency of operation and a second frequency of operation. Both the first and second frequencies associated with the particular remote system are stored in memory 208. User input device(s) 210 may comprise any number of user input devices, which may each be configured during a training mode or during manufacture to transmit a different control signal based on data stored in memory 208 and/or learned during a training operation.

Figure 3:
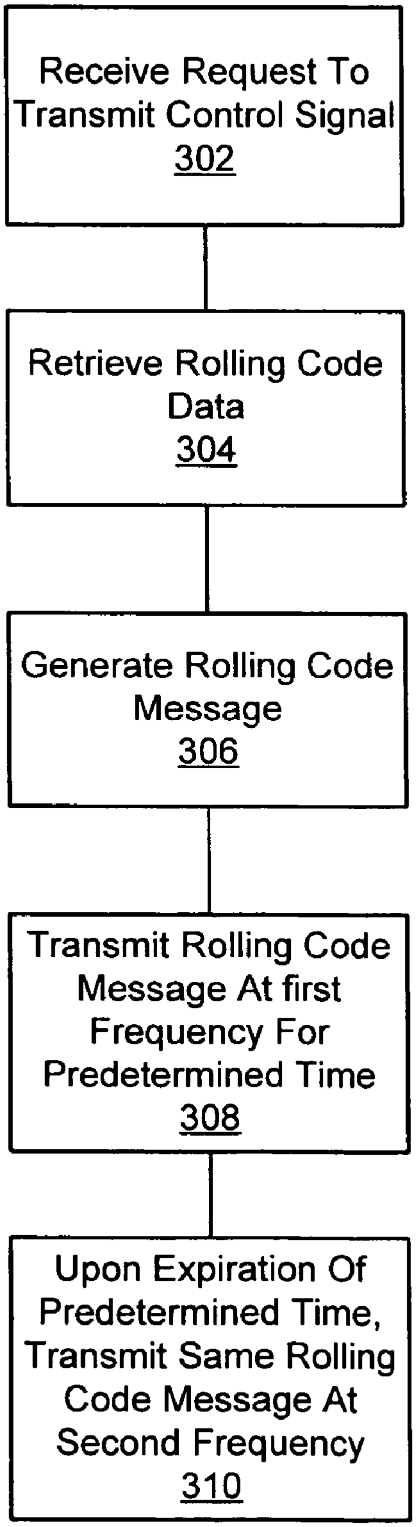
FIG. 3 illustrates a method for transmitting an RF control signal in accordance with an embodiment.

Transmitter circuit 204 communicates with a remote system via antenna 202. In response to a single user input via user input device(s) 210 (e.g., a push button), transmitter circuit 204 is configured, under control from control circuit 206, to generate and transmit a control signal using carrier frequency, control data and/or encryption algorithm information associated with a particular remote system. FIG. 3 illustrates a method of transmitting an RF control signal in accordance with an embodiment, wherein the transmitter can be an original transmitter, trainable transmitter, trainable transceiver, or other transmitting device. At block 302, a request is received at the transmitter to transmit a control signal. For example, a single user input such as actuation of a push button or other user input device may be used to initiate an operating mode or training mode of the transmitter. The single user input may be, for example, a button press of short duration (e.g., approximately one second or less) or of a more sustained duration (e.g., greater than one second). Alternative duration thresholds and configurations are contemplated. In alternative embodiments, the single user input may be a combination of key presses using user input devices of the transmitter or selecting a menu item on a display.

At block 304, rolling code data (or other encryption data), control data and/or frequency data is retrieved from memory of the transmitter. For example, the control circuit and/or transmitter circuit of the transmitter may be configured to retrieve encryption, control and/or frequency data from the memory of the transmitter. The frequency data may include a first pre-stored frequency and a second pre-stored frequency associated with the remote system. One of the frequencies may be a preferred frequency of operation for the remote system. At block 306, a rolling code message is generated using the information associated with the remote system that is retrieved from memory. At block 308, the transmitter transmits the rolling code message at a first frequency for a predetermined amount of time. In one embodiment, a counter may be used to track the length of time the rolling code message is transmitted at the first frequency. The first frequency may be a preferred frequency of operation for the remote system. Upon expiration of the predetermined time, at block 310, the same rolling code message is transmitted at a second frequency. For example, a rolling code message may be transmitted at 315 MHz for a predetermined time such as four (4) seconds and then, upon expiration of the predetermined time, the rolling code message is transmitted at 390 MHz. The same rolling code signal or message may comprise the same rolling code in both transmissions, or alternatively may comprise two different rolling codes having the same rolling code format (the format being defined by the garage door opener manufacturer). While FIG. 3 illustrates an operating mode, the steps may also be performed during a training mode.

Figure 4:
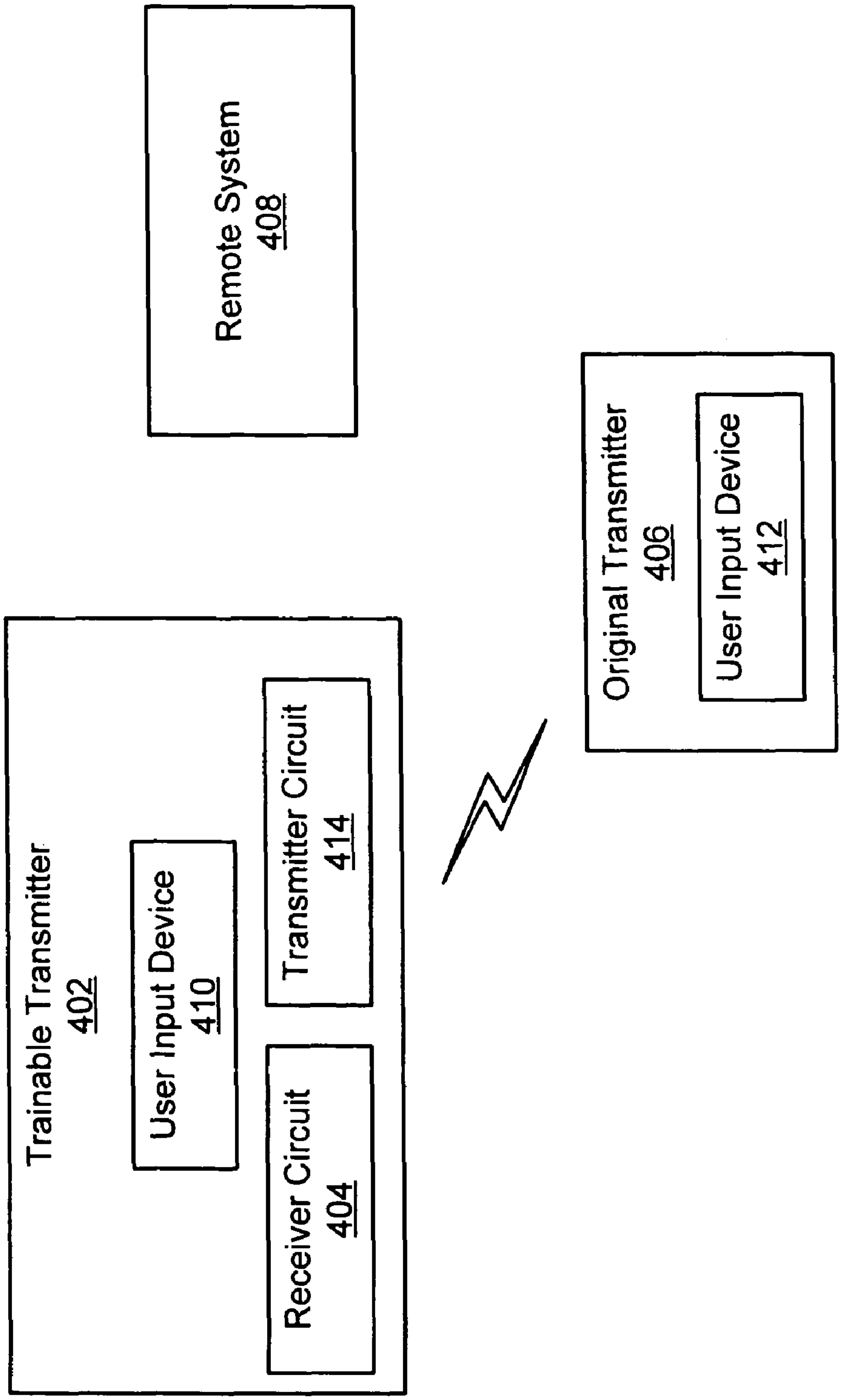
FIG. 4 is a schematic block diagram of a wireless control signal including a trainable transmitter in accordance with an embodiment.

FIG. 4 is a schematic block diagram of a wireless control system including a trainable transmitter in accordance with an embodiment. In FIG. 4, a trainable transmitter 402 is shown. Trainable transmitter 402 includes a user input device 410, a receiver circuit 404 and a transmitter circuit 414. Trainable transmitter 402 is trainable or configurable by a user to activate one or more remote systems, e.g., remote system 408, using different radio frequency control signals. In one exemplary embodiment, trainable transmitter 402 may be a HomeLink® trainable transmitter manufactured by Johnson Controls Interiors, LLC, Holland, Mich. Trainable transmitter 402 may operate, for example, as shown in any one of U.S. Pat. Nos. 5,686,903, 5,661,804 or 5,614,891, which are incorporated by reference herein in their entirety. Trainable transmitter 402 may be a hand-held transmitter or can be integrated into or coupled to a vehicle interior element such as a visor, an overhead compartment, an instrument panel, a seat, a center console, a door panel, etc. In an embodiment, remote system 408 is configured to operate at two frequencies, a first frequency and a second frequency, and trainable transmitter 402 is configured to operate at one of the first frequency and the second frequency.

Trainable transmitter 402 may be trained using original transmitter 406. Trainable transmitter 402 and original transmitter 406 are brought within range of each other. A user input device 410 of trainable transmitter 402 is actuated to place trainable transmitter 402 in a training mode. For example, a user may press a push button on trainable transmitter 402. In addition, a user input device 412 of the original transmitter 406 is actuated to transmit an RF control signal, for example, a rolling code signal. For example, a user may press a push button on original transmitter 406. Original transmitter 406 is configured, in response to the single user input, to transmit a rolling code control signal at the first frequency and the second frequency at which the remote system 408 operates. In particular, original transmitter 406 transmits the rolling code control signal at the first frequency for a predetermined amount of time. Upon expiration of the predetermined amount of time, the original transmitter 406 transmits the same rolling code control signal at the second frequency. Trainable transmitter receives the rolling code control signal at the frequency at which it is configured to operate, for example, the second frequency. Trainable transmitter 402 may then identify the carrier frequency, control data and/or encryption algorithm associated with the original transmitter 406 (and remote system 408) based on the rolling code control signal received from the original transmitter 406. The identified carrier frequency, control data and/or encryption algorithm may then be stored in memory (not shown) and associated with a particular user input device 410 (e.g., a push button) of the trainable transmitter 402. Once trained, a user may transmit an RF control signal to remote system 408 by pressing the appropriate user input device 410 of trainable transmitter 402.

While the exemplary embodiments illustrated in the FIGS. and described above are presently preferred, it should be understood that these embodiments are offered by way of example only. Accordingly, the present invention is not limited to a particular embodiment, but extends to various modifications that nevertheless fall within the scope of the appended claims. The order or sequence of any process or method steps may be varied or re-sequenced according to alternative embodiments. According to one alternative embodiment, the system and method of FIG. 3 may be modified to transmit a fixed code (e.g., dip switch-based, "billion code" based, etc.) at the first and second frequencies instead of (or in addition to) the rolling code. For example, where trainable transmitter 402 is not compatible with the first frequency (e.g., 800 MHz) but is compatible with the second frequency (e.g., 390 MHz), original transmitter 406 may transmit the fixed code at the first frequency followed by the second frequency. Trainable transmitter 402 may receive the second frequency and train to the fixed code at that second frequency. Remote system 408 may be compatible with both first and second frequencies in this embodiment.

What is claimed is:

1. A method for training a vehicle-based trainable transmitter to send an authenticated transmission to a receiver for a garage door opener using a data code from an original hand-held transmitter, the method comprising:

transmitting, from the original hand-held transmitter and in response to a single user input, the data code at a first frequency and separately at a second frequency, wherein the first frequency is configured for reception by the receiver for the garage door opener and the second frequency is configured for reception by the vehicle-based trainable transmitter;

receiving, at the receiver for the garage door opener, the data code at the first frequency and causing the garage door opener to actuate in response to the reception;

receiving, at the vehicle-based trainable transmitter, the data code from the hand-held transmitter at the second frequency, but not at the first frequency;

identifying, by the vehicle-based trainable transmitter, the data code at the second frequency;

storing, by the vehicle-based trainable transmitter, the identified data code;

associating, by the vehicle-based trainable transmitter, the stored data code with a particular user input device of the trainable transmitter;

transmitting the data code to the garage door opener and causing the garage door opener to actuate in response to the reception; and wherein the receiver is configured to recognize the data code transmitted at both the first frequency and the second frequency.

2. The method of claim 1, wherein the data code is transmitted at the first frequency for a period of time prior to transmitting the data code at the second frequency.

3. The method of claim 2, wherein the period of time is four seconds.

4. The method of claim 3, wherein the first frequency is 315 MHz and the second frequency is 390 MHz.

5. The method of claim 1, wherein the hand-held transmitter is not configured as a trainable transmitter.

6. The method of claim 1, wherein the hand-held transmitter does not include a receiver.

7. A system comprising:

a receiver for a garage door opener configured to cause the garage door opener to actuate in response to a received and authenticated transmission at a first frequency; and a original hand-held transmitter configured for operation with the receiver at the first frequency;

a vehicle-based trainable transmitter configured to recognize data codes transmitted from the original hand-held transmitter at a second frequency but not at the first frequency;

wherein the original hand-held transmitter is configured to transmit, in response to a single button press for a single normal authenticated transmission to the receiver, a data code at the first frequency and wherein the hand-held transmitter is configured to separately transmit the data code at the second frequency configured for recognition by the vehicle-based trainable transmitter;

wherein the vehicle-based trainable transmitter stores the recognized data code, associates the stored data code with a particular user input device of the trainable transmitter, and transmits the stored data code to the garage door opener and causing the garage door opener to actuate in response to the reception; and wherein the receiver is configured to recognize the data code transmitted at both the first frequency and the second frequency.

8. The system of claim 7, wherein the vehicle-based trainable transmitter is at least partially integrated with a vehicle interior element.

9. The system of claim 7, wherein the vehicle-based trainable transmitter is configured to learn the data code transmitted at the second frequency but cannot learn the data code transmitted at the first frequency.

10. The system of claim 7, wherein the data code is transmitted at the first frequency for a period of time prior to transmitting the data code at the second frequency.

11. The system of claim 10, wherein the period of time is four seconds.

12. The system of claim 11, wherein the first frequency is 315 MHz and the second frequency is 390 MHz.

13. The system of claim 7, wherein the original hand-held transmitter is not configured as a trainable transmitter.

14. The system of claim 7, wherein the hand-held transmitter does not include a receiver.

* * * * *

UNITED STATES PATENT AND TRADEMARK OFFICE

CERTIFICATE OF CORRECTION

PATENT NO. : 8,384,513 B2
APPLICATION NO. : 11/324745
DATED : February 26, 2013
INVENTOR(S) : Witkowski It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1364 days.

Signed and Sealed this
Twenty-fifth Day of November, 2014

Michelle K. Lee
*Deputy Director of the United States Patent and Trademark Office*